United States Patent
Yamashita et al.

(10) Patent No.: US 6,923,573 B2
(45) Date of Patent: Aug. 2, 2005

(54) APPARATUS AND METHOD FOR MEASURING TEMPERATURE OF MOLTEN METAL

(75) Inventors: Kosuke Yamashita, Futtsu (JP); Tomoaki Tanaka, Hikari (JP); Masato Sugiura, Futtsu (JP); Kiyomi Horikoshi, Hikari (JP); Makoto Sumi, Kitakyushu (JP)

(73) Assignees: Nippon Steel Corporation, Tokyo (JP); Nittetsu Plant Designing Corporation, Fukuoka (JP)

( * ) Notice: Subject to any disclaimer, the term of this patent is extended or adjusted under 35 U.S.C. 154(b) by 0 days.

(21) Appl. No.: 10/485,099

(22) PCT Filed: Jul. 26, 2002

(86) PCT No.: PCT/JP02/07627

§ 371 (c)(1),
(2), (4) Date: Jan. 27, 2004

(87) PCT Pub. No.: WO03/010501

PCT Pub. Date: Feb. 6, 2003

(65) Prior Publication Data

US 2004/0174922 A1 Sep. 9, 2004

(30) Foreign Application Priority Data

| Jul. 27, 2001 | (JP) | 2001-228169 |
| Apr. 5, 2002 | (JP) | 2002-103264 |
| Jul. 1, 2002 | (JP) | 2002-192319 |
| Jul. 22, 2002 | (JP) | 2002-212967 |

(51) Int. Cl.$^7$ .............................................. G01J 5/02
(52) U.S. Cl. ................... 374/139; 374/141; 374/148; 374/124; 374/125; 374/131; 374/132; 374/208; 266/88; 266/100; 266/135; 250/491.1
(58) Field of Search ................ 374/155, 157, 374/139, 140, 141, 148, 121, 124, 125, 131, 132, 208; 266/88, 100, 47, 135, 270; 250/239, 330, 491.1; 75/382

(56) References Cited

U.S. PATENT DOCUMENTS

| 4,435,093 A | * | 3/1984 | Krause et al. ............... 374/125 |
| 4,619,533 A | * | 10/1986 | Lucas et al. .................. 266/88 |
| 4,737,038 A | * | 4/1988 | Dostoomian ................ 374/139 |
| 5,133,605 A | * | 7/1992 | Nakamura ................... 374/124 |
| 5,169,233 A | * | 12/1992 | Montgomery et al. ...... 374/124 |
| 5,302,027 A | * | 4/1994 | Park ........................... 374/139 |
| 5,585,914 A | * | 12/1996 | Yamasaki et al. ........... 374/139 |
| 6,071,466 A | * | 6/2000 | Cates et al. ................ 266/100 |
| 6,172,367 B1 | * | 1/2001 | Fritz et al. ............... 250/341.6 |

FOREIGN PATENT DOCUMENTS

| JP | 02054133 | 2/1990 |
| JP | 05312651 | 11/1993 |
| JP | 11142246 | 5/1999 |
| JP | 2001083013 | 3/2001 |

\* cited by examiner

Primary Examiner—Gail Verbitsky
Assistant Examiner—Stanley J. Pruchnic, Jr.
(74) Attorney, Agent, or Firm—Baker Botts LLP

(57) ABSTRACT

The invention provides a cooling system for protecting an image fiber and an imaging device from thermal influences and a temperature measurement apparatus, for a molten metal, capable of being easily controlled and stably measuring the temperature. The temperature measurement apparatus for a molten metal comprises four connectable portions of a nozzle portion a purge/cooling gas introduction portion, an image fiber fitting portion with a window glass and an image fiber to a double pipe nozzle protection tube. A distance from a nozzle distal end as an introduction portion of thermal radiation light to a light reception portion at an image fiber distal end becomes short so that a greater amount of thermal radiation light can be received.

10 Claims, 7 Drawing Sheets

Fig.3
(a)
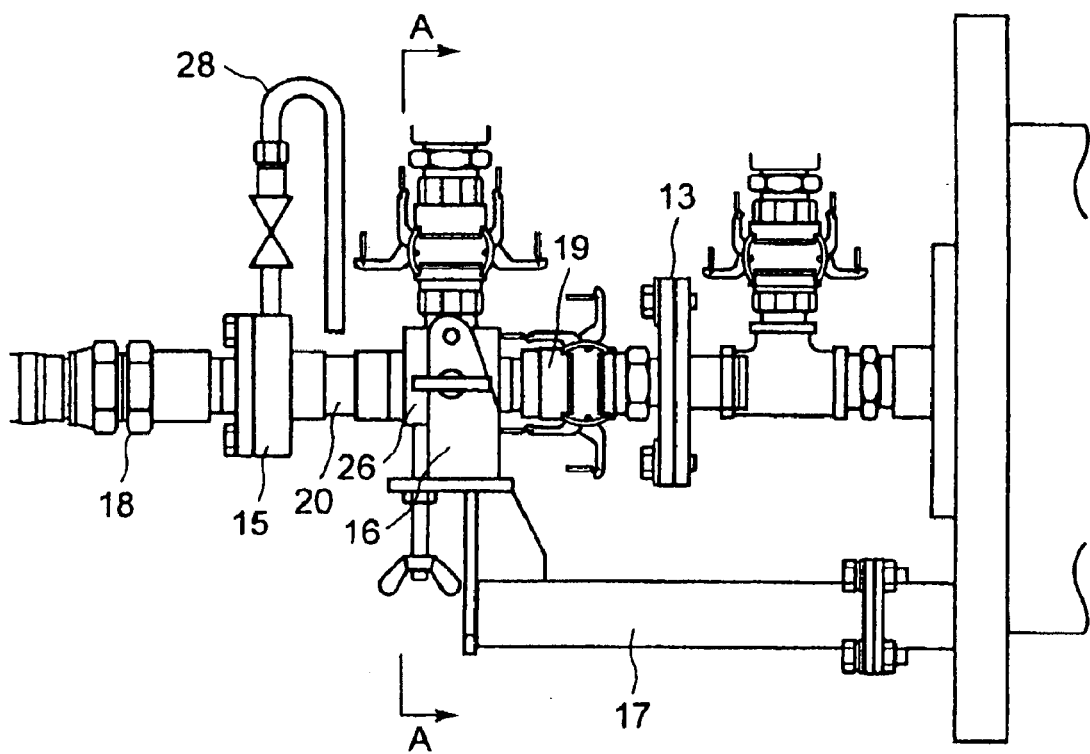
(b)
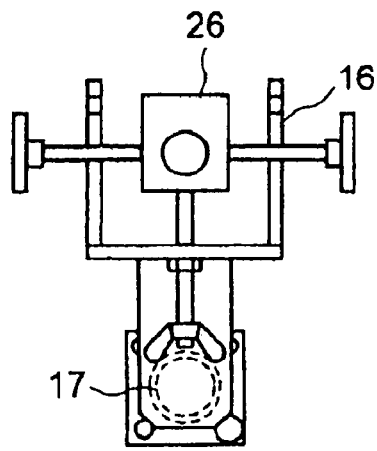

Fig. 7
(a) 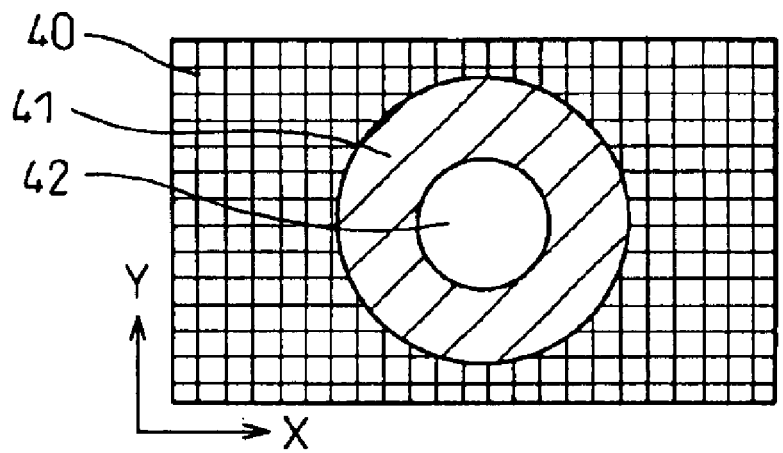
(b) 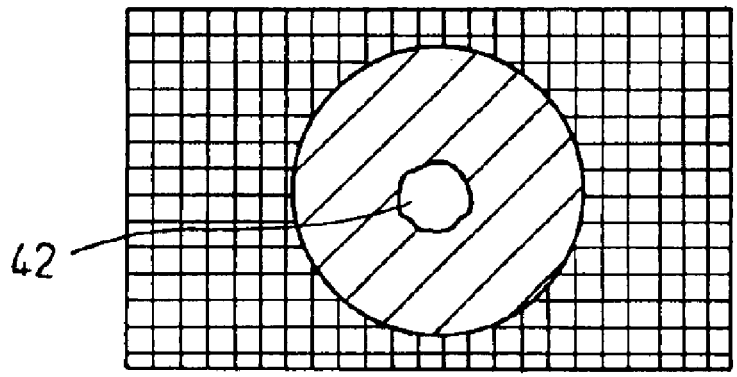
(c) 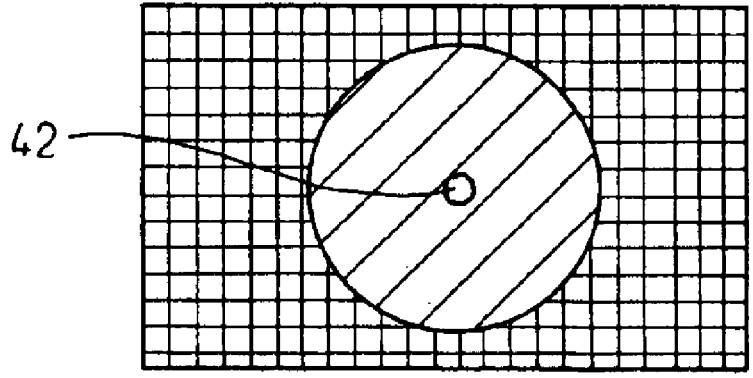

Fig. 8
(a)
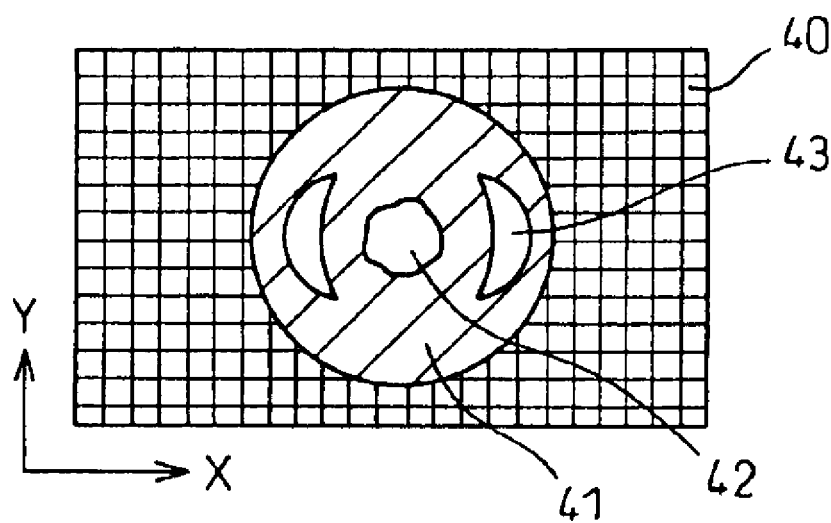
(b)
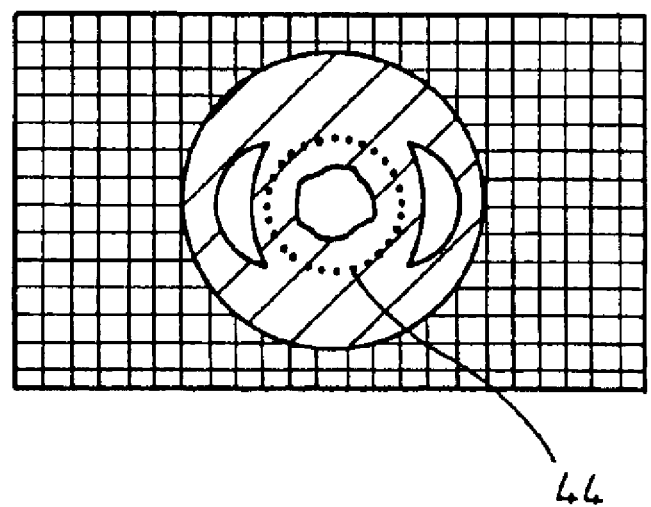

APPARATUS AND METHOD FOR MEASURING TEMPERATURE OF MOLTEN METAL

CROSS-REFERENCE TO RELATED APPLICATION(S)

This application is a national stage application of PCT Application No. PCT/JP02/07627 which was filed on Jul. 26, 2002, and published on Feb. 6, 2003 as International Publication No. WO 03/010501 (the "International Application"). This application claims priority from the International Application pursuant to 35 U.S.C. § 365. The present application also claims priority under 35 U.S.C. § 119 from Japanese Patent Application Nos. 2001-228169, 2002-103264 and 2002-192319, filed on Jul. 27, 2001, Apr. 5, 2002 and Jul. 1, 2002, respectively, the entire disclosures of which are incorporated herein by reference.

FIELD OF THE INVENTION

The present invention relates to an apparatus for continuously measuring a temperature of a molten metal by disposing a nozzle on a wall of a vessel accommodating the molten metal in such a fashion as to penetrate through the wall, guiding out thermal radiation light of the molten metal facing a distal end of the nozzle through an image fiber and measuring the temperature of the molten metal from thermal radiation light so guided out, and a temperature measurement method.

BACKGROUND INFORMATION

If a molten metal temperature can be measured accurately and continuously in a furnace for refining a molten metal, such as a converter or an AOD, and the temperature can be acquired as operation information, it would be extremely advantageous for improving efficiency of refining, quality and operation yield and for reducing various original units. To efficiently conduct refining, it is very important to continuously determine the molten metal temperature and to control the temperature to a temperature shift pattern determined in advance for each type of steel. Therefore, various methods for measuring the molten metal temperature inside the refining furnace have been attempted and improved in the past. At first, the refining furnace was tilted and an operator manually measured the molten metal temperature by using a measurement probe of a consumption type thermo-couple equipped with a protection pipe. However, this method was not free from the problems of a lack of safety due to the tilt operation and the drop of productivity due to the measurement time. Therefore, a sub-lance capable of improving an operation factor and productivity was developed and introduced. This method made it possible to automatically fit a measurement probe of a consumption type thermo-couple equipped with a protection pipe to the distal end of a water cooling lance and to conduct a remote and automatic temperature measurement.

Though capable of accurately measuring the temperature, these measurement probe systems would likely not continuously measure the molten metal temperature during refining and would likely not either execute fine refining control because they were intermittent temperature measurement systems. Because the measurement probe for the temperature measurement was consumed, the cost was high, too.

In contrast, attempts to continuously measure the temperature of the molten metal have been made in the past. An apparatus that guides thermal radiation light of the molten metal facing a nozzle distal end to a radiation thermometer through an optical fiber while preventing invasion of the molten metal into a nozzle by pressure feeding an inert gas into the nozzle penetrating through a molten metal vessel is known (for example, as described in Japanese Patent Publication Nos. 61-91529, 62-52423 and 8-15040). Further, U.S. Pat. No. 6,172,367 (corresponding to Japanese Patent Publication No. 2000-502183) describes a molten metal measurement method of an optical fiber system. Though this method can conduct continuous measurement, it is not free from the following problems. When the center of the field of the optical fiber deviates from the nozzle center or when the optical axis inclines from the nozzle center axis, the molten metal in the proximity of the nozzle distal end is likely to be solidified. When the solidified molten metal closes a part of the fiber field, radiation energy the fiber receives decreases, so that the apparent temperature is observed at a lower level. It is not possible at present to judge from the output of the radiation thermometer whether the field is closed or the temperature has actually dropped. Therefore, this method involves the problem of reliability of the measurement value. All these problems result from the fact that the measurement is so-called "point measurement" because the optical fiber is used. Incidentally, Japanese Patent Publication No. 8-15040 describes a method that feeds the optical fiber towards the molten metal to prevent the occurrence of deviation of the optical axis and brings the distal end of the optical fiber into contact with the molten metal. However, using method, the cost becomes high due to the consumption of the optical fiber.

Another apparatus (e.g., as described in Japanese Patent Publication No. 11-142246) uses a thermal radiation light emitted from the molten metal are inputted into an imaging device (such as a CCD camera) through an image fiber and measures the temperature of the molten metal from the highest luminance value on an imaging screen. Because the image fiber system used in the invention can measure the image, it can drastically improve the problems described above. The image fiber is fabricated by finely bonding more than 15,000 optical fibers and bundling them into a diameter of about 4 mm. A condenser lens having a focal length of near infinity is fitted to the distal end of the image fiber and the image in front is projected to a light reception end of the image fiber. A projection image (optical image) is as such transmitted to a light outgoing end of the image fiber. In other words, the image fiber has an optical image transmission function and transmits the optical image in front from the light reception end to the light outgoing end. The imaging device images the optical image at the light outgoing end and generates image signals. In this way, image measurement, and image analysis on the basis of the former, become possible. Consequently, it may become possible to recognize strangulation of the field at a tuyere distal end, by the molten metal, that has not been possible by use of the optical fiber, and to measure the correct temperature. Even when the optical image moves the field, due to deviation of the optical axis to a certain extent, the temperature can be measured correctly without any problem by conducting image processing. The apparatus according to the present invention has the advantage that it can continuously measure the molten metal temperature. Because two-dimensional observation is made by use of the image fiber and the molten metal is automatically extracted by image processing, deviation of the optical axis to a certain extent does not cause any problem.

In the apparatuses using the image fiber described above, however, the fiber should be fitted and removed at the time of the exchange of the converter, the AOD furnace, etc., even when conformity of the optical axes is once secured, and the optical axes are likely to greatly deviate at this time. The image fiber, that is particularly expensive, is likely to undergo thermal damage due to excessive, heat and is sometimes broken when it is fitted and removed. Furthermore, because cleaning of the pressure-resistant window glass partitioning the nozzle and the image fiber and measurement of the melting loss amount of the nozzle distal end are carried out during the operation at high temperature, they must be carried out easily and quickly.

These features are described in Japanese Patent Publication No. 2001-83013. In this publication, a tuyere portion for introducing thermal radiation light from the molten metal, a purge gas introduction portion, a pressure-resistant window glass holding portion, an image fiber centering portion and an image fiber protection tube are detachably connected to one another, and the image fiber centering portion is constituted by concave and convex portions that can be fitted and keep close contact with one another so as to facilitate centering. However, according to the construction of this centering portion, each part constituted by the concave and convex portions employs fitting and close contact and cannot easily adjust the deviation of the optical axis. Because coupling with the nozzle uses a flange structure, fitting/removal needs a long time and a quick operation in the high temperature atmosphere cannot be carried out easily. Because two nozzle gas introduction portions are generally necessary in the case of a double pipe nozzle in comparison with the single pipe nozzle in this system, the distance between the distal end of the image fiber and the distal end of the nozzle as a thermal radiation light inlet becomes great and the adjustment of the optical axes can become difficult.

A method for continuously measuring the molten metal temperature is described, for example, in Japanese Patent Publication Nos. 60-129628 and 61-17919. In these references, a radiation thermometer is fitted to the rear end of a temperature measurement nozzle penetrating through a refractory of a converter or a ladle and the molten metal temperature is measured from thermal radiation light of the molten metal facing the nozzle distal end while a gas is jetted from the temperature measurement nozzle to the molten metal. In this method, however, the gas jetted from the nozzle always cools the interface between the refractory and the molten metal in the proximity of the nozzle distal end and solidified steel called a "mushroom" (hereinafter called "solidified metal") is created. The growth of this solidified metal frequently closes the nozzle. As a result, the radiation thermometer measures the solidified metal having a lower temperature than the molten metal and a great error occurs in the measurement value.

To remove the solidified metal, it may be possible to mix oxygen with the gas to be blown and to melt the solidified metal by heat of the oxidation reaction. It has been found that according to this method, however, the melting loss of the nozzle drastically proceeds due to the rise of the molten metal temperature and the measurement cannot be made. To suppress the growth of the solidified metal, on the other hand, it may be possible to employ a method that reduces the flow rate of an inert gas and minimizes cooling of the molten metal interface. When the flow rate is insufficient, critical problems develop in that the molten metal enters the nozzle and not only the light receiver is broken but also the molten metal flows outside.

A method for preventing adhesion of the solidified metal is described in Japanese Patent Publication No. 11-281485, in which an inner diameter of a temperature measurement nozzle is set to 3 to 5 mm and stipulates the flow rate of an inert gas to be jetted from the temperature measurement nozzle to the molten metal to a range in which the solidified metal does not grow at the nozzle distal end and also does not enter the nozzle.

According to this method, however, the nozzle diameter is as small as 3 to 5 mm and the thickness of the refractory through which the nozzle penetrates is as large as about 1 m. Therefore, when bending occurs in the nozzle due to thermal deformation of the refractory, the problem occurs in that the field capable of being observed cannot be secured sufficiently. The temperature change of the molten metal is great inside the refining furnace due to the unbalance between exothermy resulting from blowing of oxygen and heat removal resulting from the addition of a cooling material and clogging of the nozzle distal end by the solidified metal cannot be completely prevented.

A refractory brick which the nozzle penetrates delicately can change its position, with the passage of the time, due to thermal expansion resulting from the high temperature, while the molten metal continuous temperature measurement of the present system is carried out. Thus, the nozzle itself may be bent, and the field can become narrow. To cope with such problems, it is preferable to delicately move the light reception portion at the distal end of the image fiber in such a fashion that its optical axis is coincident with the bending direction of the nozzle. Such fine adjustment of the light reception portion at the distal end of the image fiber is difficult if not impossible to attain by the prior art technologies and a new counter-measure is needed.

The wall of the vessel accommodating the molten metal reaches a high temperature due to heat transfer from the molten metal. Therefore, the nozzle and the image fiber connection device reach the high temperature, too, due to both of thermal conduction and radiation heat. When the furnace is tilted and the image fiber connection device is exposed to a hood inner surface at the upper part of the furnace, the device receives heat radiation from a red hot base metal adhering to the hood inner surface. Accordingly, the cooling system that protects the image fiber and the imaging device from these thermal influences, and the control method of the cooling system, should be preferably provided.

Because thermal radiation light from the molten metal is irradiated to the inner surface of the temperature measurement nozzle and to the inner surface of the connection portion from the nozzle to the image fiber, inner surface reflected light exists in the proximity of direct light from the molten metal and the temperature measurement apparatus sometimes fails to measure the correct temperature. A sufficient effect cannot be obtained to solve this problem even when a counter-measure, that brings, as much as possible, the center axis of the temperature measurement nozzle into conformity with the optical axis of the image fiber, is employed.

Because the inert gas is pressure fed into the temperature measurement nozzle to prevent invasion of the molten metal, the field of the image fiber becomes narrow or the nozzle is clogged when the molten metal in the proximity of the distal end of the nozzle is solidified and cuts off thermal radiation light from the molten metal.

A method that switches the inert gas to oxygen gas and melts the base metal at the distal end of the nozzle at the time of clogging of the temperature measurement nozzle has been previously described (for example, in Japanese Patent Publication No. 60-231141 and CAMP-ISIJ Vol. 2(1989), p.

216). However, when this method is excessively executed, the melting loss of the nozzle becomes remarkably great and when the timing of the execution of this method is not proper, the solidified metal cannot be melt and flow away even when the oxygen gas is blown. These proposals do not concretely disclose the execution method and the melt-flowing of the base metal by oxygen cannot be utilized effectively.

Japanese Patent Publication No. 60-129628 describes a method that mixes a suitable amount of oxygen with the inert gas to be blown from the temperature measurement nozzle and measures the temperature. However, the interface temperature between the blown gas and the molten metal greatly changes depending on the degree of mixing of oxygen in the blown gas. Further, because fine adjustment of the mixing proportion of the gas is difficult, it is difficult to conduct the molten metal temperature measurement with high accuracy.

Japanese Patent Publication No. 11-326061 describes a method that does not use a dedicated temperature measurement nozzle, generally flows the oxygen gas mixed with nitrogen as the blowing gas to suppress the growth of the solidified metal of the nozzle, flows nitrogen through the nozzle for the temperature measurement and switches the gas to the blowing oxygen gas after the temperature measurement is completed. This method is a so-called "batch temperature measurement method" that measures the temperature at certain points, and cannot accomplish continuous temperature measurement of the molten metal.

Each of the references cited herein are incorporated herein by reference in their entireties.

As described above, a large number of problems have yet been left unsolved and quick solution of these problems has been urgently required.

SUMMARY OF THE INVENTION

The present invention relates to a continuous measurement of meta. According to one exemplary embodiment of the present invention, an apparatus is provided for measuring a temperature of a molten metal by disposing a nozzle penetrating through a wall of a vessel accommodating a molten metal, guiding out thermal irradiation light of the molten metal facing a distal end of the nozzle through an image fiber (image transfer fiber) and measuring the temperature of the molten metal from the thermal radiation light so guided out. The nozzle has a double pipe structure, the thermal radiation light of the molten metal is observed while a purge gas is passed through an inner pipe and a protective cooling gas for protecting melting loss of the nozzle is passed through an outer pipe. A construction of a fitting portion between the nozzle and the image fiber comprises four connectable portions of a nozzle portion, a purge/cooling gas introduction portion, an image fiber fitting portion with window glass and an image fiber protection tube. At least one joint portion is disposed on the purge/cooling gas introduction portion so that centering of an optical axis can be made for connecting thermal radiation light of the molten metal to the image fiber. An imaging device such as a CCD camera for measuring two-dimensional distribution of thermal radiation luminance is connected to a rear end of the image fiber. Further, the imaging device is accommodated in a sealed box having a cooling structure and is disposed in the proximity of an outer wall of the vessel for accommodating the molten metal.

A/D conversion device can be provided for converting image signals generated by the CCD camera to digital signals, a personal computer, a nozzle gas control device and a camera control device. The personal computer can have a function of computing the temperature of the molten metal from luminance of a high luminance region (molten metal image) on a screen. The personal computer judges a hole open state at a distal end of the nozzle from the images and sends a signal indicating a gas kind or a gas flow rate to the nozzle gas control device. When the temperature of the molten metal is computed from luminance of the high luminance region (molten metal image) on the screen inputted to the personal computer, the high luminance region (molten metal image) can be extracted from inside a region designated in advance and the temperature of the molten metal is estimated from its luminance value.

The temperature of a main body of the imaging device or an atmospheric temperature inside the sealed box may be measured by a thermo-couple, or the like, and a flow rate and a pressure of a cooling gas or cooling water charged into the sealed box for keeping the temperature below an allowable upper limit temperature of the imaging device are controlled. In another exemplary embodiment of the present invention, a triple structure of an inner pipe flexible hose can be provided for inserting and protecting an image fiber cable and an image fiber protective tube for inserting and protecting the inner pipe flexible hose. The tube may have a structure such that a cooling/purge gas can be passed through the inner pipe flexible hose and through the image fiber protective tube. When the cooling/purge gas is emitted outside, a portion at a distal end of the image fiber corresponding to a lens portion at the distal end of the image fiber can be cooled by the gas from outside.

In the fitting structure of the nozzle and the image fiber, the purge/cooling gas introduction portion and/or the image fiber fitting portion with window glass may have a water cooling structure. The temperature of an image fiber blank wire or its atmospheric temperature can be measured by a thermo-couple, etc., and the flow rate or/and pressure of the purge/cooling gas or/and the cooling water may be controlled for keeping the temperature below an allowable upper limit temperature of the image fiber and the lens.

When an area of a high luminance region (e.g., a molten metal image) due to thermal radiation light on the image decreases, and accuracy of the temperature of the molten metal converted from the luminance value is deteriorated, a gas containing high concentration oxygen may be blown from the nozzle and melts a base metal (solidified metal) formed at a distal end portion of the nozzle.

According to another exemplary embodiment of the present invention, a method can be provided for removing a base metal adhering to a distal end of a nozzle having a double pipe structure and dipped into a molten metal inside a refining furnace. A temperature of a molten metal can be measured by bringing a refining furnace in operation into an empty furnace state. Then, a hydrocarbon type gas, a liquid fuel or an inflammable gas either individually or in mixture of two or more kinds may be provided through a flow path in a space between an outer pipe and an inner pipe of a nozzle having a double pipe structure. Further, a gas containing an oxygen gas adjusted to a concentration range in which the oxygen gas is combustible may be provided through the inner pipe of the nozzle. Then, a base metal adhering to a distal end of the nozzle may be melted and removed away while the refining furnace in operation is in the empty state. Further, a molten metal can be charged into the refining furnace and measuring a temperature of the molten metal. According to this method, a thermal radiation light of the molten metal facing a distal end portion of the nozzle may be provided into an imaging device through an image fiber while an inert gas for preventing invasion of the molten metal into the nozzle is pressure fed. The image signals outputted from the imaging device may be converted into digital image data, and processing can be performed based on the digital image data. Then, the temperature of the molten metal may be measured on an imaging screen.

BRIEF DESCRIPTION OF THE DRAWINGS

FIG. 3(a) is a detailed view of an optical axis adjustment portion of the nozzle connection device portion shown in FIG. 2.

FIG. 3(b) is a view of A—A section portion of the adjustment portion illustrated in FIG. 3(a).

FIG. 7(a) is an exemplary view of a cross-section of a screen of the CCD camera shown in FIG. 6 illustrating that a molten metal surface becomes small with the growth of a solidified metal at a distal end of the nozzle, in which the solidified metal hardly exists at the distal end of the nozzle.

FIG. 7(b) is an exemplary view of a cross-section of a screen of the CCD camera shown in FIG. 6 illustrating that a molten metal surface becomes small with the growth of a solidified metal at a distal end of the nozzle, indicating the state where the solidified metal adheres to the nozzle distal end but the temperature measurement can be made.

FIG. 7(c) is an exemplary view of a cross-section of a screen of the CCD camera shown in FIG. 6 illustrating that a molten metal surface becomes small with the growth of a solidified metal at a distal end of the nozzle, indicating the state where the solidified metal at the nozzle distal end grows and the temperature measurement cannot be made.

FIG. 8(a) is an exemplary view of a cross-section of a screen of the CCD camera shown in FIG. 6 representing that reflected light of the molten metal surface appears on the nozzle inner surface, indicating the state where reflected light of the molten metal surface appears on the nozzle inner surface.

FIG. 8(b) is an exemplary view of a cross-section of a screen of the CCD camera shown in FIG. 6 representing that reflected light of the molten metal surface appears on the nozzle inner surface, indicating the state where reflected light of the molten metal surface is removed by designating an area for the temperature measurement and the temperature measurement is conducted.

DETAILED DESCRIPTION

An exemplary embodiment of the present invention is described below with reference to the drawings.

Figure 1:
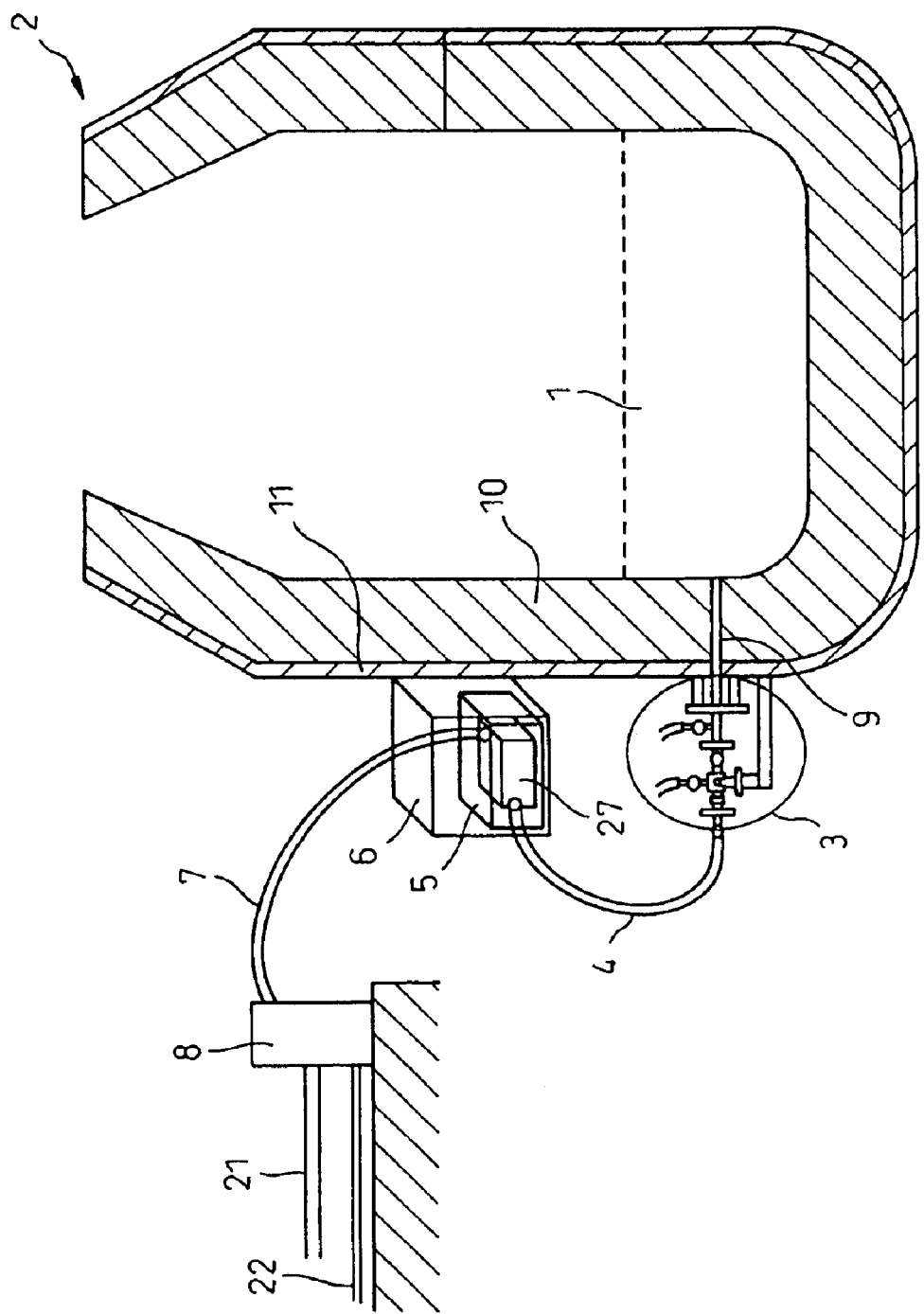
FIG. 1 is a side view of an exemplary apparatus for measuring a temperature of a molten metal for executing exemplary embodiments of the present invention.

Referring to FIG. 1, a continuous temperature measurement nozzle 9 disposed at a lower part of a side wall of a refining furnace as a vessel of a molten metal 1 is connected to an image fiber protection tube 4 through a connection device portion 3. Thermal radiation light incident from a distal end of a nozzle keeping contact with the molten metal 1 travels from a light reception portion at a distal end of an image fiber inside the connection device, is incident into a charge-coupled device ("CCD") camera 27, inside an accommodation box 5 of the CCD camera 27 through the image fiber protection tube 44, and converted to signals as images by the CCD camera 27. The signals are sent to an image processing unit through camera cables 7 and 21. A purge/cooling gas of the camera and the image fiber is introduced into the camera cable 7 from a gas piping 22 through a gas mixing vessel 8, cools the inside of the CCD camera accommodation box 5 and at an approximately the same time, cools also the connection device portion 3 through the image fiber protection tube 4.

The gas mixing vessel 8 is installed on a stationary deck but the CCD camera accommodation box 5 is fixed onto a side wall deck of the movable refining furnace. The accommodation box 5 is further accommodated in a CCD camera box protection box 6 composed of steel, and protected from dust and solidified metal, slag, and so forth that fall and scatter. The surface of the CCD camera accommodation box 5 is covered with a heat insulating board and is thermally insulated from an atmospheric temperature and heat transfer and radiation heat from a furnace wall, a hood, attaching solidified metal, slag, and so forth. The upper surface of the accommodation box 5 is a removable cover, and the rest of its five surfaces including side surfaces and lower surface are cooled with water. When the temperature exceeds the heat resistant temperature of the CCD camera 27, its performance is not guaranteed and it should therefore be kept at a temperature lower than the heat resistant temperature. Because the atmospheric temperature is high and heat conduction from the furnace body is great, at least 50% of the surface area of the CCD camera box accommodation box 5 should be cooled with water. To further lower the camera temperature, five surfaces of the side surfaces and the lower surface may be cooled with water as described above.

Figure 2:
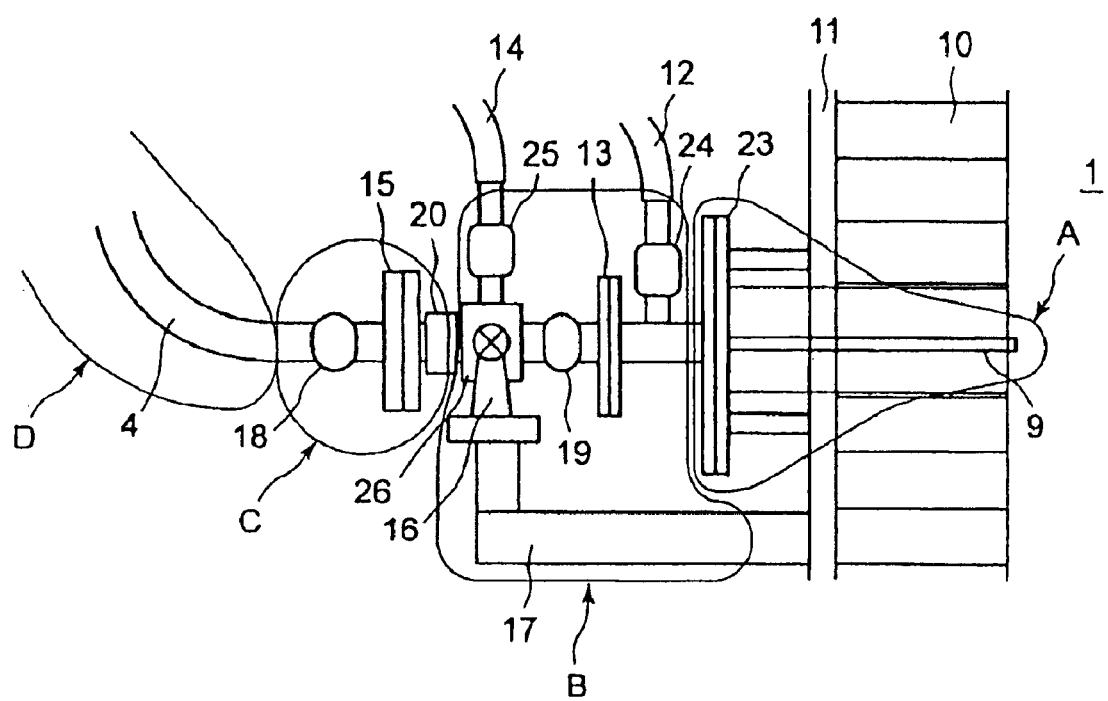
FIG. 2 is a partial enlarged view of a nozzle connection device portion of the apparatus for measuring the temperature of the molten metal shown in FIG. 1.

Referring to FIGS. 2, 3(a) and 3(b), a connection jig is disposed so that thermal radiation light incident from the distal end portion of the temperature measurement nozzle 9 keeping contact with the molten metal can pass, as much as possible, through the image fiber 4 and deviation of the optical axis of thermal radiation light resulting from various causes can be adjusted as quickly as possible.

The continuous temperature measurement nozzle 9 penetrates through a protective refractory 10 of the refining furnace, a refining furnace outer shell 11 and a nozzle flange portion 23, and connected to a nozzle outer pipe gas feed piping 12. This piping 12 for the outer pipe can be fitted and removed by use of a connection coupler 24. Further, the continuous temperature measurement nozzle 9 is connected to the image fiber connection device through an adjustment flange 13. The adjustment flange 13 is fastened by use of a bolt but play is provided in an orthogonal direction to the nozzle axis at the point before fastening of the bolt so that the position of the image fiber connection device can be adjusted. So as to quickly fit and remove the image fiber connection device, a connection coupler 19 can be used between the continuous temperature measurement nozzle and the image fiber connection device. In an actual operation, the frequency of size measurement of the remaining length of the continuous temperature measurement nozzle would likely be relatively high. When the measurement is made by removing this connection coupler, the fitting/removing time can be significantly reduced.

The connection coupler 19 on the image fiber side is connected to a connection block 26 connected to an image fiber distal end jig 20. The connection block 26 is connected to the nozzle inner pipe gas feed piping 14 through a connection coupler 26 that can be fitted and removed quickly so that the connection block 26 can be quickly fitted and removed at the time of exchange of the furnace body. The connection block 26 has a rectangular shape, and supported and fixed by an optical axis adjustment device 16 having a butterfly screw structure capable of adjusting the position in the direction orthogonal to the optical axis of thermal radiation heat. The optical axis adjustment device 16 is fixed to the refining furnace shell 11 through an optical axis adjustment device support portion 17. Because the connection device and the like on the image fiber side relative to the connection coupler 19 are fitted and removed in the high temperature atmosphere, these devices may be produced while their weight is reduced as much as possible in consideration of a work load.

The optical axis adjustment work for bringing the axis of the continuous temperature measurement nozzle 9 into conformity with the optical axis of the image fiber distal end jig 20 will be explained concretely and serially. After the size measurement of the remaining nozzle length is completed, all the piping, jigs, etc, shown in FIG. 2 are again connected. The connection bolt of the adjustment flange 13 is loosened to a certain extent and the connection block 26 is finely adjusted in the direction orthogonal to the optical axis with respect to the optical axis by use of this optical axis adjustment device 16 so as to bring the optical axes into conformity with each other. The connection bolt of the adjustment flange 13 that has been loosened is fastened. A connection jig such as a ball joint capable of adjusting the position between the continuous temperature measurement nozzle on the stationary side and the movable image fiber side can replace this adjustment flange 13. Besides the butterfly screw structure for manually adjusting the optical axis, an electric screw system capable of remote operation can be used for the optical axis adjustment device 16. To conduct the optical axis adjustment work in the proximity of the furnace body, the work can be done quickly by connecting a mobile television monitor to image thermal radiation light and conducting the adjustment work while watching the image on the screen.

Because of the heat resistance of the image fiber, allowable upper limit temperatures exist for the image fiber and lenses, and they are likely to be broken unless the temperatures are lower than the upper limit temperatures. Therefore, the following cooling system is introduced.

Figure 4:
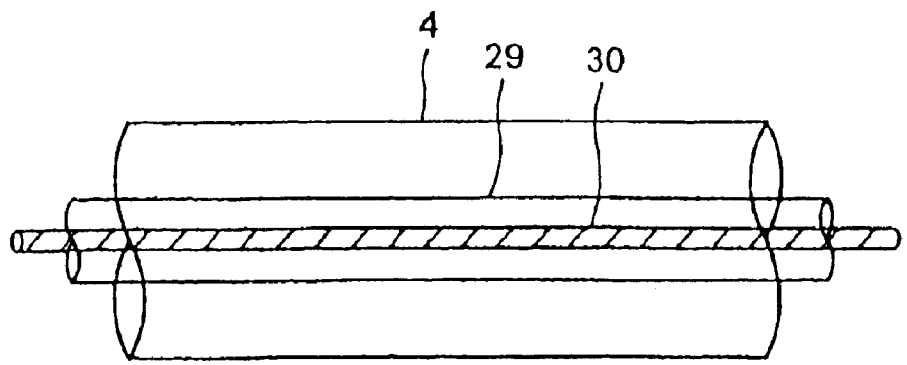
FIG. 4 is a view of an exemplary image fiber protection tube structure.

As shown in FIG. 4, the image fiber cable 30 is inserted into a soft inner pipe flexible tube 29 such as Teflon (which is a trade name). The inner pipe flexible tube 29 is fitted into the image fiber protection tube 4 typified by a stainless steel flexible tube. When a purge/cooling gas is passed through these image fiber protection tube 4 and inner pipe flexible tube 29, the image fiber cable is cooled. To improve the cooling effect, it is preferable to wind a heat resistant tape such as a ceramic fiber heat insulating material round the outside of the image fiber protection tube 4.

The cooling gas of the image fiber passes through the inside of the image fiber protection tube 4 and is emitted outside from the image fiber fitting portion 15. In a concrete example of the gas emission structure shown in FIGS. 3(*a*) and 3(*b*), the gas flows from the image fiber fitting portion 15 through the cooling/purge gas emission pipe 28 and is directly blown to the outside of the image fiber distal end jig 20. Thus, the image fiber distal end light reception portion is compulsively cooled by the gas from outside, as well.

Figure 5:
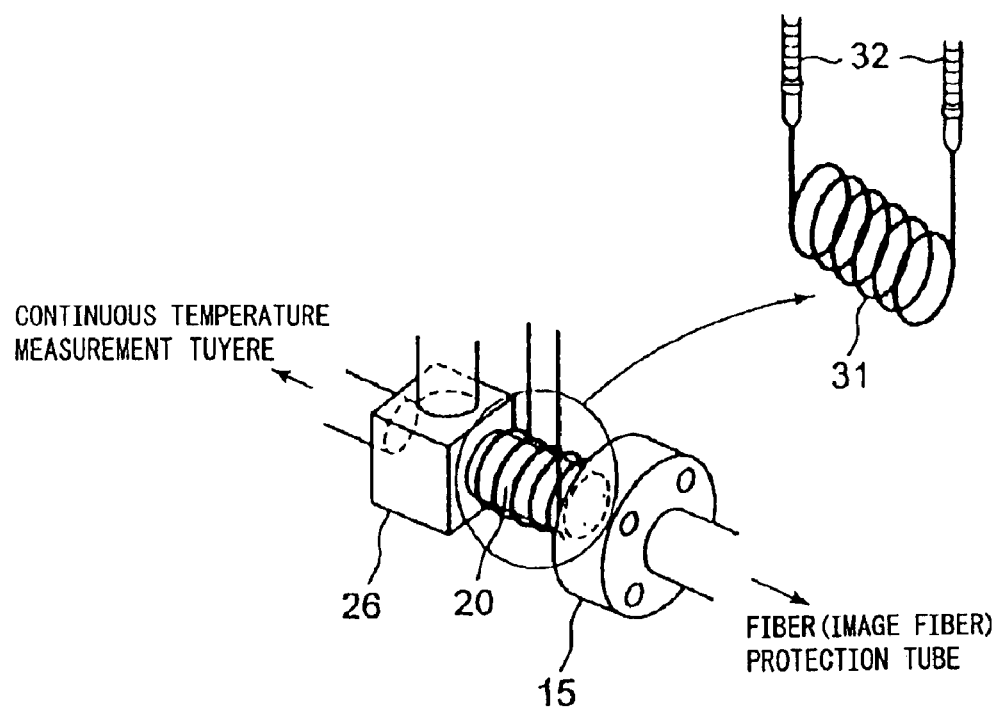
FIG. 5 is a view of an exemplary water cooling structure of an image fiber distal end jig.

To further improve the cooling capacity, on the other hand, it is also possible to cool, with water, the image fiber distal end light reception portion by arranging cooling water. As an example of a direct cooling structure, the image fiber end jig 20 may have a water cooling jacket structure. From the aspect of easiness of fitting and removal of the image fiber distal end jig 20 shown in FIG. 5, however, a method that winds a water cooling steel pipe 31 round the outside of the image fiber distal end jig 20 and connects it to a flexible hose 32 for cooling water can be employed as shown in FIG. 5.

The flow rate of the cooling medium such as the cooling gas or cooling water is preferably controlled while the temperature of the image fiber distal end jig 20 is measured by use of a thermo-couple so as to attain a target temperature.

Figure 6:
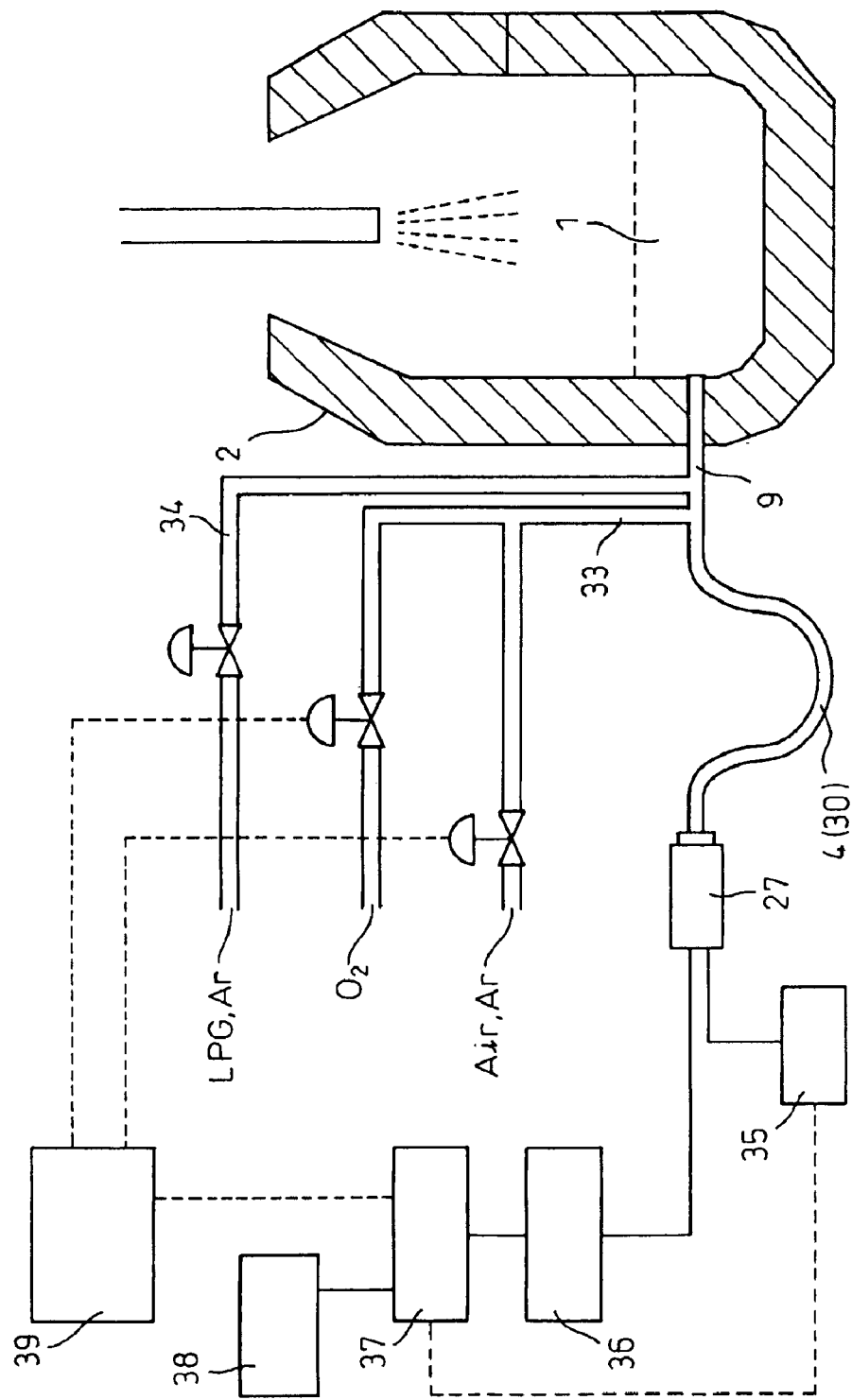
FIG. 6 is a system diagram of an apparatus for measuring a temperature of a molten metal according to the present invention.

FIG. 6 shows an exemplary diagram of a system according to the present invention. The image fiber 4 (30) is connected to the back surface of the temperature measurement nozzle 9 disposed at the lower part of the side wall of the refining furnace 2 as the vessel of the molten metal 1 in such a fashion as to penetrate through the side wall. An inert gas (such as argon gas, nitrogen gas, $CO_2$ gas, etc) is pressure-fed into the nozzle 9 through a nozzle purge gas piping 33 and is blown to the molten metal 1 from the nozzle opening distal end portion that keeps contact with the molten metal so that the flow of the molten metal into the nozzle 9 can be prevented. The inert gas so blown out turns to bubbles and floats up inside the molten metal. Therefore, the inert gas is blown out from the nozzle to the molten metal and thermal radiation light emitted from the molten metal at the interface with the molten metal 1 strikes the light reception end of the image fiber 4 (30).

A fiber bundle obtained by coupling finely and tightly more than 15,000 optical fibers into a bundle having a diameter of amount 4 mm, for example, can be used as the image fiber 4. A condenser lens having a focal distance near to infinity is fitted to the distal end (light reception end) of the image fiber 4 (30) and a front image is projected to the light reception end of the image fiber 4 (30). A projection image is as such transmitted to the light outgoing end of the image fiber 4 (30).

The CCD camera 27, for example, can be used as an imaging device. The CCD camera 27 images the image at the light outgoing end of the image fiber 4 (30) and outputs analog image signals (video signals representing luminance). The shutter speed of the CCD camera 27 and its read-out (video signal output level) are controlled using a controller 38.

Next, the analog image signal (video signal) described above is applied to an image input device 39. The image input device 36 converts the video signals to digital image data (data representing luminance) of 640 pixels in a main scanning X direction and 480 pixel in a sub-scanning Y direction at 256 gradations and writes the data into its internal memory. This operation is repeated and the latest digital image data is held. The image input device 36 transfers the digital image data so held to a computing device 37 (e.g., a personal computer). The computing device 37 provides this digital image data into the internal memory (hereinafter called "image memory"). The CCD camera 37 images an optical image of the image fiber with the number of repetition of 20 to 30 screens per second. The digital image data corresponding to this one imaging operation is called "one frame (one screen)".

The computing device 37 executes the following temperature measurement processing of the digital image data taken in a cycle of about 5 times per second and displays the result on a CRT display as an external output device. Incidentally, the output device 38 further includes a printer and an external memory device.

FIGS. 7(a)–7(c) show exemplary images expressed by the digital image data described above. Under a particular condition, a nozzle inner surface image 41 can be provided at the center of an image screen 40 as shown in FIG. 7(a), and a molten metal image 42 may be provided at the center of this image 41. The molten metal image 42 is an optical image of the molten metal and has the highest luminance inside the image screen. The nozzle inner surface image 41 has the lowest luminance. An outside region of this nozzle inner surface image is an outside region of the light outgoing end face of the image fiber 4 (30) and has the lowest luminance. The personal computer 37 sends an electronic shutter changeover signal to the camera controller so that the image luminance assumes an appropriate value.

The temperature measurement processing method by the computing device 37 is explained briefly using an example shown in FIG. 7(a). For example, each pixel data taken into the computing arrangement 37 represents luminance. To extract the molten metal image, luminance of each of the molten metal image and the nozzle inner surface image is digitized to distinguish them from each other. In particular, a "threshold value A" for digitization is set. Pixel data having luminance exceeding the "threshold value A" is recognized as the molten metal image 42 ("1") and pixel data having luminance less than the "threshold value A" is recognized as the nozzle inner surface image 41 ("0"). For example, "1" encompassed by "0" on the binary image memory may be converted to "0", and "0" encompassed by "1" can be converted to "1". All the "1" regions can become substantially the molten metal image 42, and all the "0" regions become substantially the nozzle inner surface image 41. The "threshold value A" for digitization is not particularly limited so long as it can sufficiently distinguish the molten metal image from the measurement result, and thus can be set appropriately.

The temperature of the molten metal can be measured by converting luminance of the molten metal image extracted in this way to the temperature. To acquire luminance of the molten metal image, the pixels inside the molten metal image are preferably averaged. Luminance can be converted to the temperature on the basis of photo-electric conversion characteristics of luminance-to-temperature conversion that is in advance calibrated in a pixel unit installed in a blackbody furnace, for example.

Then, an X direction distribution histogram (accumulation value of the number of "1" distributed in a Y direction at each X position) is created on the binary image memory and a Y direction distribution histogram is similarly created. An integration value Sh of the number of "1" distributed in the Y direction at each X position of the X direction distribution histogram is determined. This Sh value can be determined as the area of the molten metal image 42.

When the molten metal image 42 is under the condition shown in FIG. 7(a) during such a temperature measurement, that is, when the solidified metal dos not substantially exist at the outer periphery of the distal end of the temperature measurement nozzle, thermal radiation light can be sufficiently taken into the imaging apparatus and the temperature measurement of the molten metal can be made stably and highly precisely.

However, because the inert gas (such as the argon gas) is passed through the nozzle during the temperature measurement, the solidified metal is formed and grows around the periphery of the distal end of the nozzle. In consequence, the section of the incident passage of thermal radiation light from the molten metal becomes smaller. FIGS. 7(b) and 7(c) show such an example. As shown in FIG. 7(b), the solidified metal at the distal end of the nozzle does not need to be so large. Therefore, the molten metal image 42 can secure a certain size and a temperature having relatively high accuracy can be obtained by the temperature measurement processing by the personal computer. FIG. 7(c) shows the case where the solidified metal at the distal end of the nozzle further grows and the molten metal image 42 becomes so small that the temperature having sufficiently high accuracy cannot be obtained even when the temperature measurement processing is carried out.

When the correlation between the error data of the estimated temperature subjected beforehand to the temperature measurement processing from the actual temperature and the area Sh of the molten metal image 42 is put in order, the range of the area Sh of the molten metal image 45 in which the temperature measurement data having high accuracy can be obtained can be quantitatively estimated.

A "threshold value b" of the area Sh of the molten metal image 42 is in advance set for the case where allowable accuracy of the estimated temperature is not satisfied, and the following processing is executed when accuracy is lower than this "threshold value b". In such case, the "threshold value b" is a value determined depending on allowable accuracy of the estimated temperature and allowable accuracy of the estimated temperature may be set appropriately in accordance with the object.

As a measure for the case where the estimated temperature is lower than the "threshold value b", it is possible, for example, to change the nozzle purge gas from the inert gas to the oxygen gas so as to remove the solidified metal at the distal end of the nozzle during refining as described above. The nozzle gas controlling device 39 generally opens the purge gas controlling valve and introduces the inert gas (such as the Ar gas) through the nozzle inner pipe gas piping 33 as shown in FIG. 6. On the other hand, the nozzle gas controlling device 39 opens the outer pipe gas controlling valve and introduces the cooling gas (such as the Ar gas) to the outer pipe through the nozzle outer pipe gas piping 34. Therefore, the oxygen control valve is opened to introduce the oxygen gas into the nozzle inner pipe gas piping 33 and at the same time, closes the purge gas controlling valve to cut off the purge gas (such as the Ar gas). As to the outer pipe, the change of the gas speed is not necessary, in particular. Consequently, the oxygen gas flows in place of the purge gas through the inner pipe of the temperature measurement nozzle 9 and the solidified base metal at the distal end of the nozzle can be molten and flows away.

After a predetermined molten flow time passes, the purge gas controlling valve is opened while the oxygen controlling valve is closed, the nozzle purge gas is switched to Ar and the temperature measurement of the molten metal is continued. The term "predetermined base metal molten flow time" can be defined as the time in which the solidified base metal at the distal end of the nozzle can be sufficiently molten and flows away, the molten metal image capable of temperature measurement can be acquired, and melt flow of not only the solidified base metal at the nozzle distal end but also the nozzle pipe itself due to the excess of the molten flow time can be prevented. This time can be set appropriately from past records, and so forth. While the area Sh of the molten metal image 42 is measured, opening for feeding oxygen is made when Sh is below a certain "threshold value b". This operation is repeated and the temperature measurement of the molten metal can be made continuously.

Next, thermal radiation light from the molten metal surface is incident to the inner surface of the temperature measurement nozzle and to the inner surface of the connection portion up to the image fiber. Therefore, the temperature measurement device measures the temperature inclusive of reflected light and cannot sometimes make a correct temperature measurement. Under this condition, the image of reflected light 43 of the nozzle inner surface is observed on both outer sides or on one of the sides of the molten metal image inside the nozzle inner surface image 41 on the imaging screen as shown in FIG. 8(*a*), for example.

This problem can be substantially solved to by bringing the center axis of the temperature measurement nozzle, as much as possible, into conformity with the optical axis of the image fiber or by bringing the center position of the high luminance region on the imaging screen into conformity with the temperature measurement position. The accuracy can be improved by the following method.

In particular, the present invention makes it possible to conduct correct temperature measurement by setting in advance a temperature measurement area 44 exclusive of nozzle inner surface reflected light 43 for the imaging screen obtained by taking thermal radiation light of the molten metal into the imaging device through the image fiber onto the image processing unit 36 and onto to the computing device 37.

According to the present invention, an identification method of nozzle inner surface reflected light utilizes the difference of luminance between the molten metal image and nozzle inner surface reflected light. Because luminance of nozzle inner surface reflected light is generally lower than luminance of the molten metal image, nozzle inner surface reflected light can be identified by comparing their images on the imaging screen.

A method of setting a temperature measurement area designation region 44 is not particularly limited so long as the temperature measurement area other than nozzle inner surface reflected light 43 is designated arbitrarily.

The following method may be used, for example.

First, the X direction distribution histogram of "1" on the binary image memory (an accumulated value of "1" distributed in the Y direction at each X position) may be created, and the position of the center of gravity can be assumed as Wx. Similarly, the Y direction distribution histogram may be created, and the position of its center of gravity can be assumed as Wy. Next, the position (Wx, Wy) is regarded as the center position of the molten metal image 42, that is, (Wx, Wy) is defined as the center of the temperature measurement area designation region 44. The center point of the area to be measured and a boundary point inside a certain selectable range (corresponding to the radius of a circle in FIG. 7(*b*)) are designated through the personal computer 37 and are set to the image processing unit 36.

Another exemplary method can be as follows. The operator may designate a region of an arc, for example, to the center of the molten metal image and can define the temperature measurement area. In the case of this method, it is preferred from the aspect of management to increase the frequency of designation of the temperature measurement area much more than the method described above.

The reason why the center point of the temperature measurement area designation region 44 and the boundary point of the temperature measurement area designation region should not be determined as a constant is because the molten metal image 42 does not always exist at the center of the nozzle inner surface image 41. As described above, the molten metal image 42 exists in some cases in the proximity of the nozzle inner surface image 41 when the center axis of the temperature measurement nozzle deviates from the optical axis of the image fiber or when the nozzle distal end solidified metal is formed non-uniformly. Therefore, the center point of the temperature measurement area designation region 44 and the boundary point of the temperature measurement area designation region are preferably changed appropriately by the designation method described above depending on the position of the molten metal image on the imaging screen.

As also described above, both of the influences of reflected light and the influences of the solidified metal adhering to the nozzle distal end can be suppressed by blowing the oxygen gas to the nozzle distal end portion facing the molten metal from inside the nozzle in accordance with the change of the area of the high luminance region designated by the method of setting the temperature measurement area designation region.

It is also possible to switch the purge gas to the oxygen gas during refining and to melt and blow away the base metal at the distal end of the nozzle as described above. However, this exemplary method involves the problem of melt-flow in the case of the base metal that excessively grows on the inner pipe side. Therefore, a method that brings the refining furnace into an empty furnace state and melts and blows away the base metal adhering to the nozzle distal end by burning.

More concretely, when a temperature measurement nozzle having a double pipe structure is used, a hydrocarbon type gas, a liquid fuel or an inflammable gas is caused to flow either individually or in mixture of two or more kinds through the nozzle outer pipe and an oxygen-containing gas adjusted to a concentration range in which the oxygen gas is combustible is caused to flow through the inner pipe of the tuyere.

This exemplary operation will be explained with reference to FIG. 6. While the flow rate is controlled by the oxygen gas control valve, the oxygen gas is caused to flow by the nozzle gas control device 39 into the inner pipe through the nozzle inner gas piping 33. While the flow rate is controlled by the outer gas control valve, the LPG is caused to flow into the outer pipe through the nozzle outer pipe gas piping 34.

When the combustion described above takes place, the amount of the adhering base metal decreases and the base metal can be removed. The oxygen gas concentration within the combustible concentration range may be appropriately set in accordance with experiments or actual operation records, etc, and is not particularly limited. However, the oxygen gas concentration is preferably at least 50 vol % due to a significant combustion effect. The gas to be mixed with the oxygen gas is generally and preferably an inert gas (N2, Ar, etc) because it is used as a combustion assistant.

The hydrocarbon type gas to be blown is not particularly limited but LPG and LNG are preferred from the aspects of combustibility and the cost. The liquid fuel is not particularly limited, either, and a suitable fuel such as kerosene is preferably used from the aspects of combustibility and the cost. Furthermore, the inflammable gas is not particularly limited but a CO-containing gas is preferred from the aspects of combustibility and the cost. The hydrocarbon gas, the liquid fuel and the inflammable gas may be caused to flow either individually or as a mixture with an inert gas such as nitrogen, Ar, $CO_2$, and so forth.

During cooling with air, however, there sometimes occurs the case where the LPG gas is not ignited even when the oxygen gas and the LPG gas are respectively caused to flow suddenly through the inner pipe and the outer pipe to melt and blow away the base metal at the distal end of the nozzle. Therefore, at least the inner surface of the base metal at the nozzle distal end on the center axis side in the longitudinal direction of the nozzle) can be continuously pre-heated for a while prior to melt-flow of the base metal. In this manner, in the subsequent melt-flow step of the base metal, ignition and combustion of the base metal by oxygen can be easily brought forth. When pre-heating is carried out, heat can be applied to the base metal without almost reducing the amount of the adhering base metal.

The oxygen concentration range inside the inner pipe gas capable of pre-heating is not particularly limited but is set appropriately in accordance with the intended pre-heating condition or with experiments or actual operation records. Air may be used, for example, or a mixed gas of the oxygen gas and the inert gas (N2, Ar, etc) may be used.

The combustion gas caused to flow through the flow path of the outer pipe of the nozzle is not particularly limited in the same way as when the base metal is molten and blown away but the hydrocarbon type gas such as LPG or LNG is preferred from the aspect of combustibility and the coast. The liquid fuel is not particularly limited, either, but a suitable fuel such as kerosene must selected in consideration of combustibility and the cost. The inflammable gas is not particularly limited, either, but CO is preferred from the aspect of combustibility and the cost.

The pre-heating method is not particularly limited and such methods which have the heating function can be suitably employed. The pre-heating time is not particularly limited, either, and can be suitably set in accordance with experiments and actual operation records.

An exemplary pre-heating method is described below with reference to FIG. 6. Prior to melt-flow of the base metal, pre-heating air (Air) is caused to flow into the inner pipe through the nozzle inner pipe gas piping 33 while its flow rate is controlled by the air control valve. The LPG is caused to flow into the outer pipe through the nozzle outer pipe gas piping 34 while its flow rate is controlled by the outer pipe gas control valve, and undergoes ignition with the refractory attaining a high temperature inside the furnace as the ignition source. According to the experiments of the present applicant, the pre-heating time of at least about 5 minutes is preferably secured.

After the base metal adhering to the distal end of the nozzle is removed in the manner described above, the temperature of the molten metal can be measured with high accuracy by utilizing the temperature measurement nozzle when the molten metal is charged into and is refined inside the refining furnace.

As described above, the form of the base metal can be detected in the invention through the change of the gas flow rate and/or the internal pressure in the nozzle inner pipe. When the base metal at the nozzle distal end grows and the gas flow path of the inner pipe is narrowed near to closure, the gas flow rate drops and the gas pressure becomes high. Therefore, the degree of the growth of the base metal can be detected from these changes.

When the image fiber fitted to the nozzle is used, the degree of growth of the base metal can be detected also from the increase/decrease of the number of effective pixels on the screen of the temperature measurement device imagining thermal radiation light of the molten metal through the image fiber.

When the base metal at the nozzle distal end grows and the inner pipe remarkably tends to be closed, the imaging field by thermal radiation light becomes narrow and the number of effective pixels on the imaging screen decreases. The degree of growth of the base metal at the nozzle distal end can be known by determining this change of the number of effective pixels.

INDUSTRIAL APPLICABILITY

The present invention can accurately determine the molten metal temperature, drastically reduce the production cost by conducting a proper operation and setup management and at the same time, stably manufacture high-quality steel.

What is claimed is:

1. An apparatus for measuring a temperature of a molten metal, comprising:
    a nozzle which is configured to penetrate through a wall of a vessel accommodating a molten metal, the nozzle having a double pipe structure;
    inner and outer pipes;
    an image fiber guiding a thermal radiation light of the molten metal facing a distal end of the nozzle, the thermal radiation light of the molten metal is observed while a purge gas is passed through the inner pipe, and while a protective cooling gas for protecting a melting loss of the nozzle is passed through an annular gap space between an outer pipe and an inner pipe of nozzle, wherein a fitting portion is provided between the nozzle and the image fiber, the fitting portion including four connectable portions of the nozzle portion, a purge/cooling gas introduction portion, an image fiber fitting portion with a window glass and an image fiber protection tube;
    at least one joint portion disposed on the purge/cooling gas introduction portion so that an optical axis is centered for connecting the thermal radiation light of the molten metal to the image fiber;
    an imaging device configured to measure a two-dimensional distribution of a thermal radiation intensity, the imaging device is connected to a rear end of the image fiber, wherein the imaging device is accommodated in a sealed box having a cooling structure, and is disposed in a proximity of an outer wall of a vessel for accommodating the molten metal; and
    an arrangement configured to measure the temperature of the molten metal from the thermal radiation light guided by the image fiber.

2. The apparatus according to claim 1, wherein the imaging device is a charge-coupled device ("CCD") camera.

3. The apparatus according to claim 1, further comprising:
    an analog-to-digital conversion device adapted to convert image signals generated by the CCD camera to digital signals;
    a computing device;
    a nozzle gas control device; and
    a camera control device,
    wherein the computing device determines the temperature of the molten metal from an intensity of a high intensity region of an image of the molten metal obtained by the CCD camera, and
    wherein the computing device determines a hole open state at the distal portion of the nozzle based on the image signals, and transmits a signal indicating one of a gas type and a gas flow rate to the nozzle gas control device.

4. The apparatus according to claim 3, wherein, upon the receipt of the temperature of the molten metal computed by the computing device, the high intensity region is extracted from within a pre-designated region, and the computing device determines the temperature of the molten metal from an intensity value thereof.

5. The apparatus according to claim 1, further comprising a thermocouple device which measures one of the temperature of a main body of the imaging device and an atmospheric temperature within the sealed box, wherein a flow rate and a pressure of one of a cooling gas and a cooling water charged into the sealed box for keeping the temperature below a predetermined upper temperature limit of said imaging device are controlled.

6. The apparatus according to claim 1,
wherein the apparatus includes a triple structure of:
an inner pipe flexible hose for inserting and protecting an image fiber cable an image fiber protective tube for inserting and protecting the inner pipe flexible hose, and
an arrangement to pass a cooling/purge gas through the inner pipe flexible hose and through the image fiber protective tube, and
wherein, when the cooling/purge gas is externally emitted, a portion at a distal end of the image fiber corresponding to a lens portion at the distal end of the image fiber is coolable by the gas externally.

7. The apparatus according to claim 6, further comprising a thermocouple device which measures one of the temperature of the image fiber and an atmospheric temperature of the image fiber, wherein at least one of the flow rate and the pressure of at least one of the purge/cooling gas and the cooling water are controlled for maintaining the temperature below an allowable upper limit temperature of the image fiber and the lens portion.

8. The apparatus according to claim 1, wherein, in the fitting portion, at least one of the purge/cooling gas introduction portion and the image fiber fitting portion with a window glass includes a water cooling structure.

9. The apparatus according to claim 8, further comprising a thermocouple device which measures one of the temperature of the image fiber and an atmospheric temperature of the image fiber, wherein at least one of the flow rate and the pressure of at least one of the purge/cooling gas and the cooling water are controlled for maintaining the temperature below an allowable upper limit temperature of the image fiber and a lens portion.

10. The apparatus according to claim 3, wherein, when an area of the high intensity region due to thermal radiation light on the image decreases, and accuracy of the temperature of the molten metal converted from the intensity value becomes deteriorated, the nozzle blows a gas containing a high concentration of oxygen so as to melt adhered solid metal that is formed at the distal portion of the nozzle.

* * * * *